United States Patent
Chen

(10) Patent No.: US 7,900,715 B2
(45) Date of Patent: Mar. 8, 2011

(54) VARIABLE SPEED TOOL AND VARIABLE SPEED CONTROL METHOD

(75) Inventor: Chengzhong Chen, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 215 days.

(21) Appl. No.: 12/305,311

(22) PCT Filed: Jun. 15, 2007

(86) PCT No.: PCT/CN2007/001900
§ 371 (c)(1),
(2), (4) Date: Dec. 17, 2008

(87) PCT Pub. No.: WO2008/000144
PCT Pub. Date: Jan. 3, 2008

(65) Prior Publication Data
US 2009/0277658 A1    Nov. 12, 2009

(51) Int. Cl.
*B23B 47/14*    (2006.01)
(52) U.S. Cl. ........... 173/183; 173/47; 173/181; 173/217; 173/176
(58) Field of Classification Search .......... 173/183, 173/47, 181, 217; 475/266
See application file for complete search history.

(56) References Cited

U.S. PATENT DOCUMENTS

| | | | |
|---|---|---|---|
| 4,689,534 A * | 8/1987 | Gerber et al. | 388/809 |
| 4,834,192 A * | 5/1989 | Hansson | 173/178 |
| 4,869,131 A | 9/1989 | Ohmori | |
| 4,892,013 A | 1/1990 | Satoh | |
| 5,263,906 A * | 11/1993 | Antonov | 475/257 |
| 5,440,215 A * | 8/1995 | Gilmore | 318/432 |
| 5,897,454 A | 4/1999 | Cannaliato | |
| 5,987,754 A | 11/1999 | Hirabayashi et al. | |
| 6,093,128 A | 7/2000 | Seith | |
| 6,099,433 A | 8/2000 | Brouwer | |
| 6,165,096 A | 12/2000 | Seith | |
| 6,431,289 B1 | 8/2002 | Potter et al. | |
| 6,502,648 B2 | 1/2003 | Milbourne | |
| 6,523,442 B2 | 2/2003 | Lehnert et al. | |
| 6,536,536 B1 * | 3/2003 | Gass et al. | 173/2 |
| 6,599,219 B2 | 7/2003 | Pan | |

(Continued)

FOREIGN PATENT DOCUMENTS

CN    1050466 C    3/2000

(Continued)

*Primary Examiner* — Brian D Nash
(74) *Attorney, Agent, or Firm* — Kirton & McConkie; Evan R. Witt

(57) ABSTRACT

The present invention has disclosed a variable speed tool and a variable speed control method. The tool includes a switch; a gearbox housing; a motor; an outputting shaft; a multistage transmitting gear train and a gearshift ring which are mated with the motor and the outputting shaft, the gearshift ring having inner teeth; a gearshift fork mated with the gearshift ring; a tension spring arranged between the gearbox housing and the gearshift fork; and a torque sensing ring provided with a sliding groove in which the gearshift fork is movably disposed. When the load of the outputting shaft has reached to a predetermined value, the torque sensing ring makes the gearshift fork move axially in the sliding groove under the action of the tension spring, thus bringing the gearshift ring to move axially. The variable speed tool of the present invention may automatically adjust the rotating speed and the torque of the outputting shaft according to a variation of the load torque.

50 Claims, 8 Drawing Sheets

U.S. PATENT DOCUMENTS

| | | |
|---|---|---|
| 6,655,470 B1 | 12/2003 | Chen |
| 6,676,557 B2 | 1/2004 | Milbourne et al. |
| 6,729,414 B2 | 5/2004 | Cooper et al. |
| 6,758,783 B1 | 7/2004 | Chen |
| 6,796,921 B1 | 9/2004 | Buck et al. |
| 6,824,491 B2 | 11/2004 | Chen |
| 6,857,983 B2 | 2/2005 | Milbourne et al. |
| 6,939,262 B1 | 9/2005 | Yu |
| 6,971,454 B2 * | 12/2005 | Bogue .............................. 173/2 |
| 6,984,188 B2 | 1/2006 | Potter et al. |
| 7,066,691 B2 | 6/2006 | Doyle et al. |
| 7,101,300 B2 | 9/2006 | Milbourne et al. |
| 2009/0071671 A1 * | 3/2009 | Zhong et al. .................. 173/176 |

FOREIGN PATENT DOCUMENTS

| | | |
|---|---|---|
| CN | 1748950 A | 3/2006 |
| GB | 2399148 A | 9/2004 |
| JP | 2004160592 A | 6/2004 |

* cited by examiner

VARIABLE SPEED TOOL AND VARIABLE SPEED CONTROL METHOD

BACKGROUND OF THE INVENTION

1. Field of the Invention

The present invention relates to a variable speed tool, and more particularly to a tool, such as an electric drill, a screw driver, and a hammer drill, which has a multistage variable speed transmitting mechanism for outputting various rotational speeds as being driven by an electric motor, a pneumatic motor, or a hydraulic motor and a variable speed control method for controlling the variable speed tool.

2. Description of the Prior Art

A variable speed tool, such as an electric drill, a screw driver, and a hammer drill, has a multistage variable speed transmitting mechanism that may output various rotating speeds according to a variation of the load torque. The multistage variable speed transmitting mechanism of the variable speed tool typically comprises a multistage transmitting gear train and a gearshift device, which are coupled between a motor and an outputting shaft. An axial movement of the gearshift device changes the relationship of engagement with the multistage transmitting gear train, thereby varying transmission ratio and outputting various rotating speeds. In the state of the art, the operation of adjusting the gearshift device is performed manually. For example, U.S. Pat. No. 6,655,470 discloses a manual speed changing mechanism. The speed changing mechanism comprises a movable gear that is connected via an engaging member to a push button that is mounted to a base and axially movable. An operator pushes the push button for axial movement to cause the movable gear to move axially so that the movable gear selectively locks a first inner teeth ring or a second inner teeth ring to the base, or the movable gear simultaneously engage both the first and second inner teeth rings to have them rotating together, whereby three different outputs different rotational speeds and different torques can be provided. However, such a manual operation requires the operator to constantly watch the operation condition and variation of load of the tool for determining the timing for adjusting the speed changing mechanism. Such a manual operation is not friendly to the operator.

BRIEF SUMMARY OF THE INVENTION

One technical problem to be solved by the present invention is to provide a variable speed tool, which comprises a gearshift device that automatically adjusts the rotating speed and the torque of an outputting shaft according to variation of load torque.

Another technical problem to be solved by the present invention is to provide a variable speed tool, which can stably work in a state of high output rotating speed and the low torque.

Another technical problem to be solved by the present invention is to provide a variable speed tool, which can stably work in a state of low output rotating speed and the high torque.

Another technical problem to be solved by the present invention is to provide a variable speed control method for controlling a variable speed tool, which allows the variable speed tool to automatically change output rotating speed according to output load torque thereof.

A technical solution of the present invention is to provide a variable speed tool comprising a switch, a gearbox housing, a motor, an outputting shaft, a multistage transmitting gear train coupled to the motor and the outputting shaft, a gearshift ring, and a torque sensing ring, wherein the variable speed tool further comprises a gearshift fork coupled to the gearshift ring and a first spring member which drives the gearshift fork in an axial direction of the gearshift ring. A second spring member is arranged between the torque sensing ring and the housing. One of the torque sensing ring and the gearshift fork forms a sliding groove and the other one forms a guiding portion movably received in the sliding groove. When a load of the outputting shaft reaches a predetermined value, the torque sensing ring overcomes a spring force of the second spring member and rotates to a second angular position so that the gearshift fork is driven by the first spring member to take axial movement thereby moving the gearshift ring from a first axial position to a second axial position.

Another technical solution of the present invention is that sliding groove comprises at least an arc groove, an axial groove having an end connecting to the arc groove, and an oblique groove connecting the arc groove and the axial groove at distant locations. The arc groove, the axial groove, and the oblique groove form a continuous path.

A further technical solution of the present invention is that the sliding groove is defined in an outer circumferential surface of the torque sensing ring. The sliding groove has two axial surfaces and two side surfaces. One of the axial surfaces has a middle portion that protrudes inward to form a projecting portion that comprises a topside and two lateral sides. A pair of sliding levers is respectively disposed at opposite ends of the sliding groove. The sliding lever comprises a main body of a right-angled triangular shape or a right-angled trapezoidal shape. The main body has a straight side, and the straight side, together with the topside of the projection portion, and the other one of the axial surfaces of the sliding groove delimit the arc groove. The main body has another straight side, and the another straight side and the side surface of the sliding groove delimit the axial groove. The main body has a hypotenuse and the hypotenuse and the respective lateral side of the projecting portion delimit the oblique groove.

A further technical solution of the present invention is that the sliding lever has an end that is free and an opposite end rotatably connected to a first arc groove. The sliding lever comprises a connecting portion radially extending downward from the main body. A third spring member is arranged between the connecting portion and the first arc groove. The sliding lever is acted upon by the third spring element to have the hypotenuse of the main body abutting against the respective lateral side of the projecting portion so as to close the end of the oblique groove that is close to the projecting portion. One of the straight sides of the main body and the topside of the projecting portion together form a continuous surface of the arc groove.

A further technical solution of the present invention is that the oblique groove has a bottom that gradually ascends from an end connecting the axial groove to an opposite end connecting the arc groove to make an end surface of the oblique groove higher than a bottom of the arc groove. One of the straight sides of the main body, the end surface of the oblique groove, and the topside of the projecting portion together form a continuous end surface of a second arc groove.

Moreover, the technical solution of the present invention further comprises a positioning device that comprises two axially-extending first holes defined in a front surface of the torque sensing ring, a second axial hole and a third hole in communication with the second hole defined in the gearbox housing, a compression spring and a positioning latch being received in the second hole, the positioning latch comprising a main body axially extending rearward along the second hole, and comprises a positioning releasing device, the positioning releasing device comprising supporting feet extending out of the gearbox housing through the third hole and the switch. The supporting feet and the switch are detachably connected together.

The variable speed tool of the present invention uses the feature that a first planetary gear set drives the rotation of a first inner toothed ring when a load torque increases and forms the sliding groove in the outer circumferential surface of the first inner toothed ring (namely the torque sensing ring) with the gearshift ring coupled to the gearshift fork of which the guiding portion is movably received in the sliding groove and the gearshift fork made axially moveable under the action of a first spring member so as to cause the gearshift ring to axially move and change the engagement relationship thereof with the multistage transmitting gear train, thereby realizing automatic adjustment of the rotating speed and the output torque of the outputting shaft.

The sliding groove of the present invention comprises at least an arc groove, an axial groove, and an oblique groove connecting the arc groove and the axial groove and a guiding portion of a gearshift fork is received in the sliding groove and is movable along a continuous path formed by the arc groove, the axial groove and the oblique groove. When the variation of a load torque does not reach a predetermined value, the first inner toothed ring rotates between an initial first angular position and a second angular position and drives the guiding portion of the gearshift fork to move in the arc groove. Due to being blocked by a continuous end surface of the arc groove formed by a sliding lever and a projecting portion or a continuous end surface of the arc groove formed by the sliding lever, the end surface of the oblique groove and the projecting portion, the gearshift fork is prevented from axial movement, thereby ensuring stable operation of the variable speed tool when the gearshift ring is set at a first axial position. It is understood that those having ordinary skills in the art can easily set the scope of the load torque within which the variable speed tool is of stable operation by modifying curving of the continuous end surface when the gearshift ring is set at the first axial position, so as to also change the predetermined load torque required for outputting different rotating speeds.

The first inner toothed ring of the present invention forms in a front end surface thereof two axial first holes and the gearbox housing forms a second axial hole and a third hole in communication with the second hole with a compression spring and a positioning latch received in the second hole and the positioning latch and a switch being detachably connected together. When the load torque exceeds the predetermined value, the first inner toothed ring rotates to a side surface (namely rotating to the second angular position) with respect to the gearshift fork, and the gearshift fork axially moves along the axial groove under the action of a first spring member to bring the gearshift ring to a second axial position; meanwhile, the axial first hole of the front end surface of the first inner toothed ring rotates to a position of being aligned to the second axial hole of the gearbox housing to allow the positioning latch to insert into the first axial hole of the first inner toothed ring under the action of the compression spring, thereby preventing the first inner toothed ring from rotating and thus ensuring stable operation of the variable speed tool when the gearshift ring is located at the second axial position, and the outputting shaft outputs a second rotating speed.

A variable speed control method in accordance with the present invention comprises a step of providing a variable speed tool comprising a power source, a housing, an outputting shaft, a multistage transmitting gear train coupled to the power source and the outputting shaft, a torque sensing device coupled to the multistage transmitting gear train and having an axis of rotation, and a gearshift device coupled to the torque sensing device and movable between a first axial position and a second axial position, wherein the outputting shaft provides a first output rotating speed and a second output rotating speed that are different when the gearshift device is located at the first axial position and the second axial position respectively. The variable speed control method comprises the following steps:

(1) sensing an outputting torque of the outputting shaft by the torque sensing device;

(2) converting a variation of the outputting torque so sensed into a rotation angle of the torque sensing device;

(3) maintaining the gearshift device at the first axial position to have outputting shaft providing the first output rotating speed when the rotation angle of the torque sensing device is between a first angle and a second angle; and (4) moving the gearshift device to the second axial position to have the outputting shaft providing the second output rotating speed when the rotation angle of the torque sensing device reaches the second angle.

The variable speed control method of present invention further comprises a positioning step for positioning the torque sensing device at the second angle, when the rotation angle of the torque sensing device reaches the second angle, so as to set the gearshift device at the second axial position and allow the outputting shaft to continuously provide the second output rotating speed, and further comprises a positioning releasing step for releasing the torque sensing device from being positioned at the second angle, when the torque of the outputting shaft becomes zero, so as to return the gearshift device back to the first axial position and allow the outputting shaft to provide the first output rotating speed.

BRIEF DESCRIPTION OF THE DRAWINGS

The present invention will be further described with reference to a preferred embodiment in which an electric drill is taken as an example, together with the attached drawings, wherein.

And in the drawings.

Figure 1:
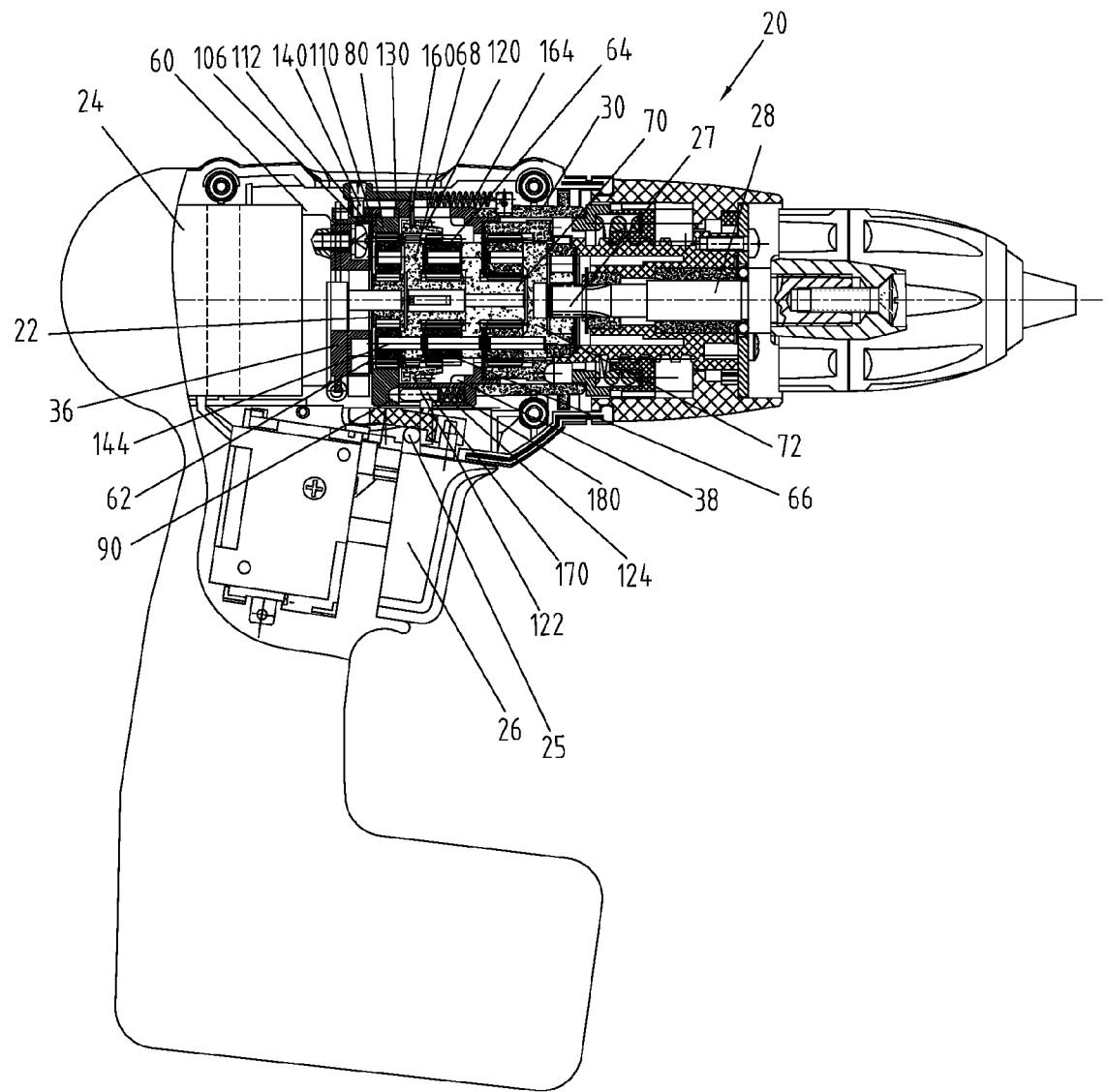
FIG. 1 is a partial cross-sectional view of an electric drill according to a first preferred embodiment of the present invention, wherein a gearshift ring is located at a first position.
Figures 2, 3:
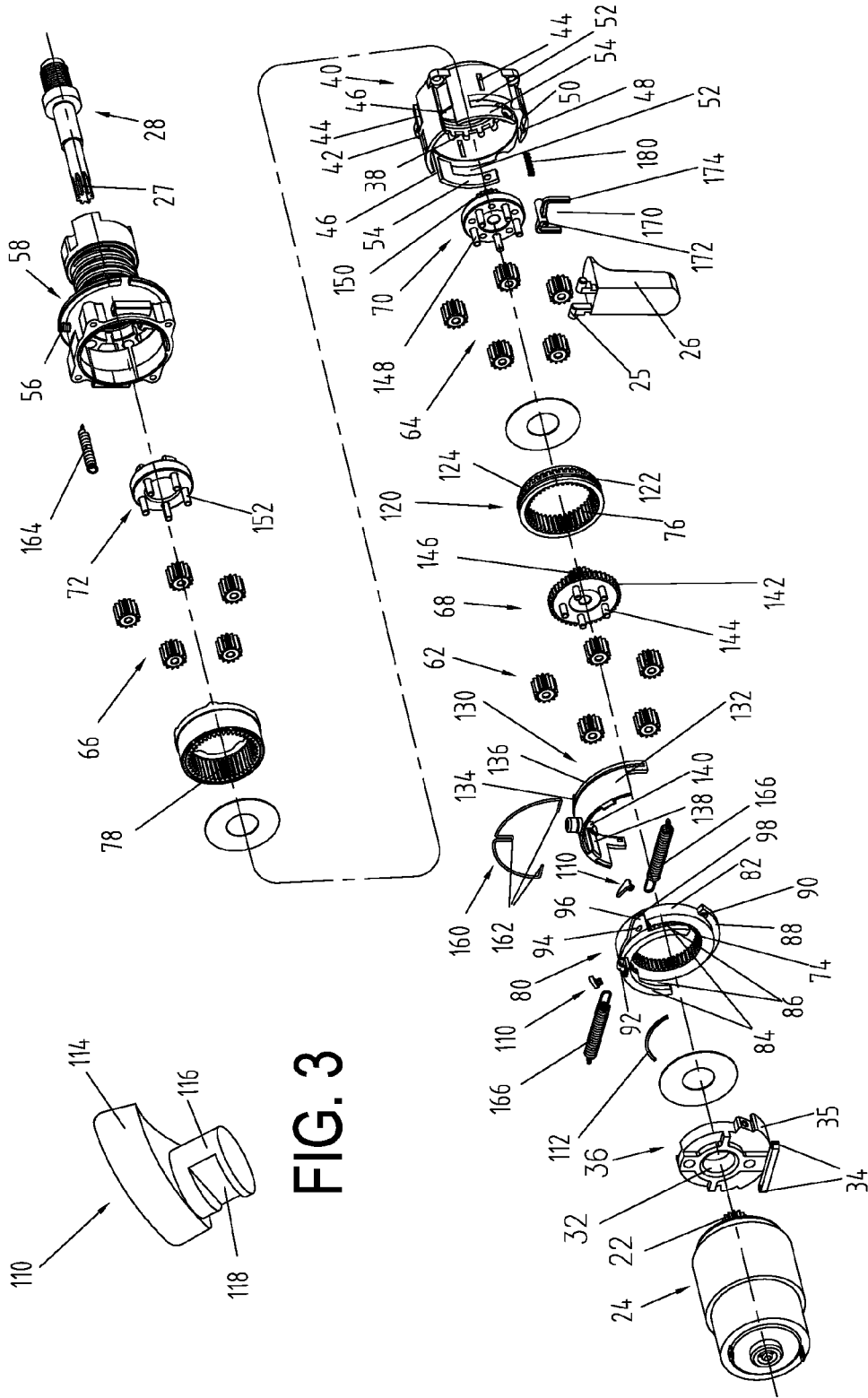
FIG. 2 is an exploded view of a multistage variable speed transmitting mechanism of the electric drill according to the first preferred embodiment of the present invention.
FIG. 3 is a perspective view of a sliding lever according to the first preferred embodiment of the present invention.
Figure 4A:
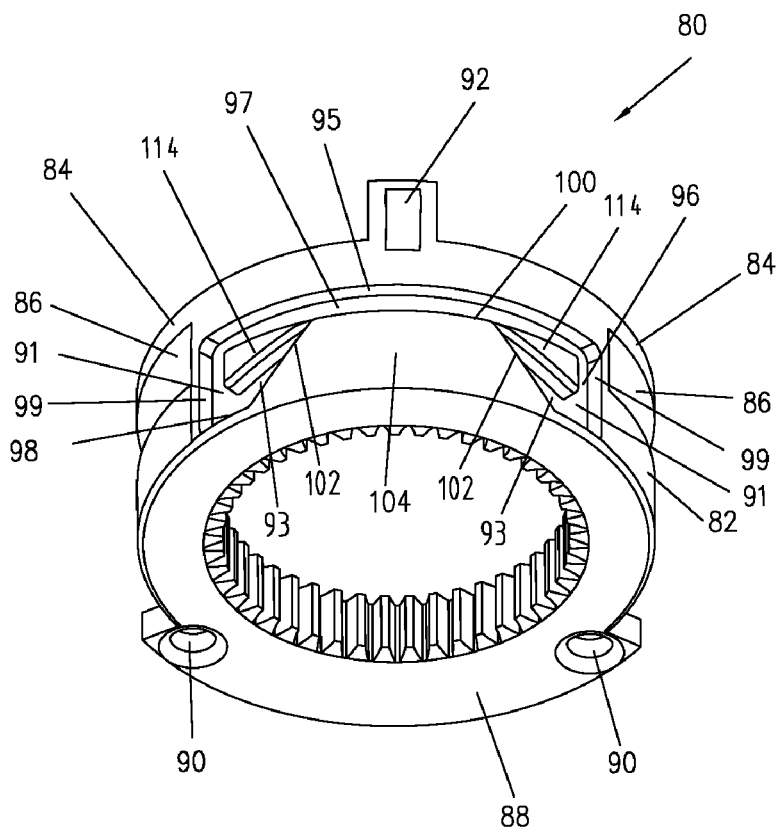
FIG. 4a is a front perspective view of a torque sensing ring according to the first preferred embodiment of the present invention.
Figure 4B:
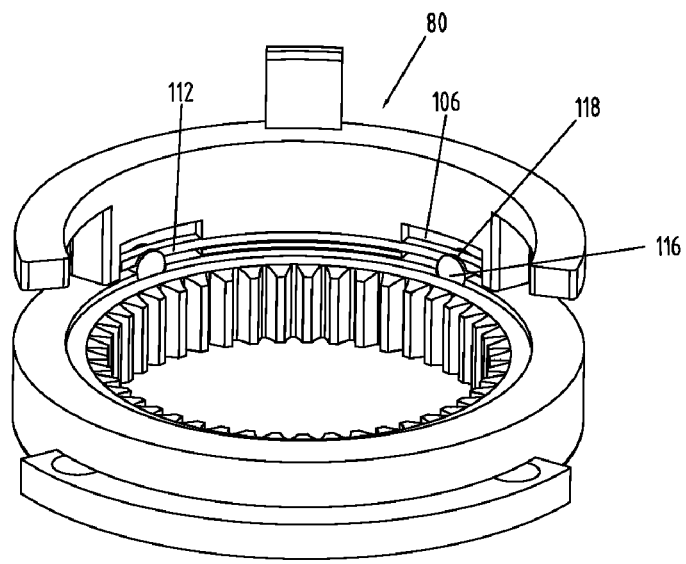
FIG. 4b is a rear perspective view of the torque sensing ring according to the first preferred embodiment of the present invention.
Figure 5:
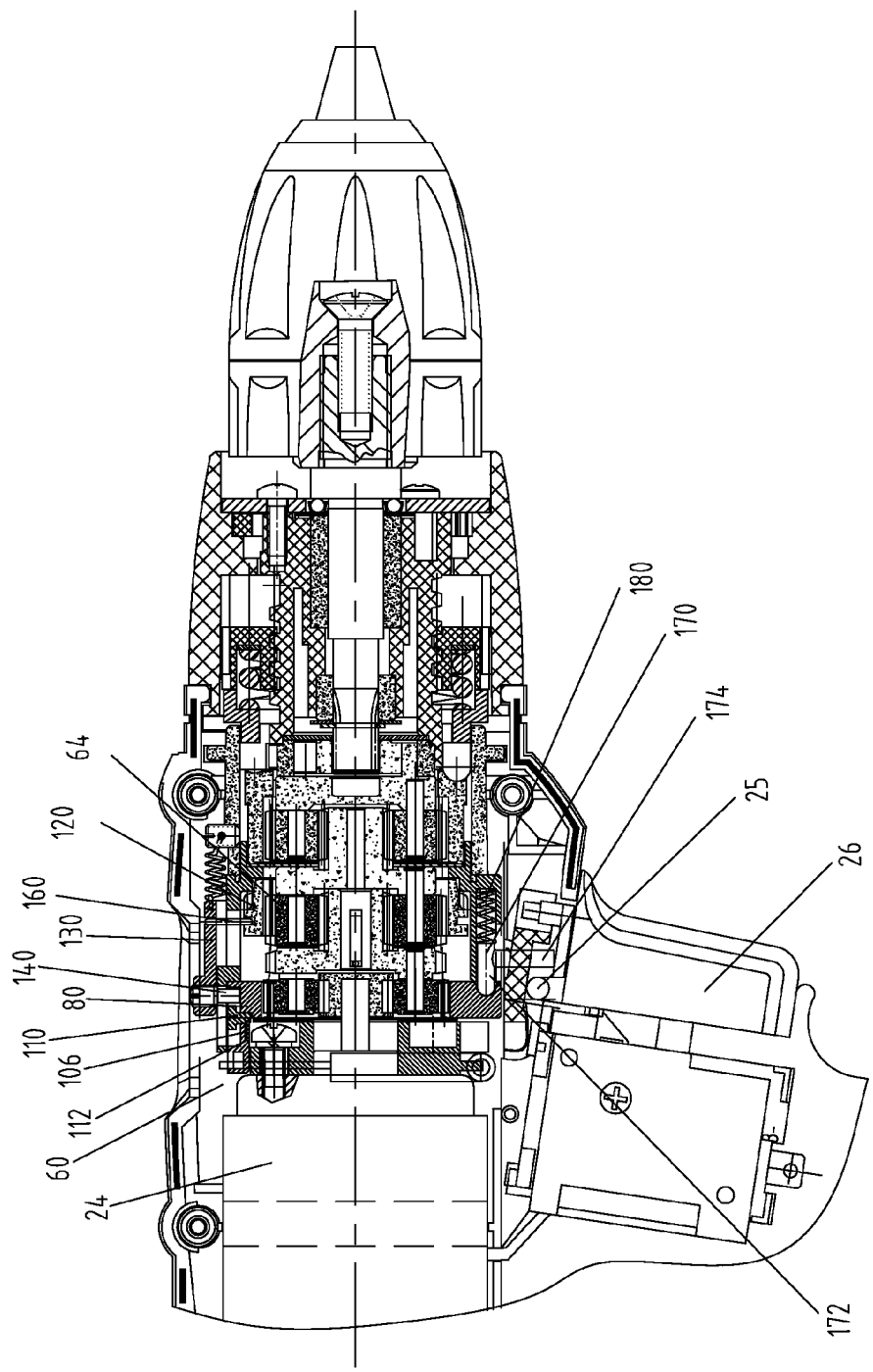
FIG. 5 is a partial cross-sectional view of the electric drill according to the first preferred embodiment of the present invention, wherein the gearshift ring is located at a second position.

| | | |
|---|---|---|
| 20 electrical drill | 22 motor shaft | 24 motor |
| 25 bracket | 26 switch | 27 outer toothed ring |
| 28 outputting shaft | 30 gearbox housing | 32 central bore |
| 34 connecting hole | 35 protruding portion | 36, 36' supporting disk |
| 38, 38' groove | 40, 40' first gearbox housing | 42 first axial slot |
| 44 second axial slot | 46 axial guiding groove | 48 second hole |
| 50 third hole | 52 arc groove | 54 arc supporting leg |
| 56 projection | 58 second gearbox housing | 60 multistage transmitting gear train |
| 62 first planetary gear set | 64 second planetary gear set | 66 third planetary gear set |
| 68 first planetary frame | 70, 70' second planetary frame | 72 third planetary frame |
| 74 first inner toothed ring | 76, 76' second inner toothed ring | 78 third inner toothed ring |
| 80, 80a, 80b torque sensing rings | 81 second arc groove | 82 annular main body |
| 83 end surface | 84 arc supporting leg | 86 arc groove |
| 88 protruding portion | 90 first hole | 91 axial groove |
| 92 protruding portion | 93 oblique groove | 94 through hole |
| 95, 95' rear surface | 96, 96' sliding groove | 97 arc groove |
| 98 front surface | 99 side surface | 100 topside |
| 102 lateral side | 104 projecting portion | 106 first arc groove |
| 110 sliding lever | 112 metal spring plate | 114 main body |
| 116 connecting portion | 118 groove | 120, 120' gearshift ring |
| 122 annular groove | 124, 124' protruding portion | 130 gearshift fork |
| 132 main body | 134 through hole | 136 arc groove |
| 138 rib | 140 guiding portion | 142, 142' outer toothed ring |
| 144 frame | 146 first sun gear | 148 frame |
| 150 second sun gear | 152 frame | 160 C-shaped metal ring |
| 162 supporting foot | 164 tension spring | 165 compression spring |
| 166 tension spring | 167 compression spring | 170 positioning latch |
| 172 main body | 174 supporting foot | 180 compression spring |
| 181 end surface | | |

DETAILED DESCRIPTION OF THE PREFERRED EMBODIMENT

An electric drill 20 will be taken as an example to describe a preferred embodiment of the present invention, more particularly a gearshift device realizing an axial movement of a gearshift ring and a gear-shifting method thereof.

Referring to FIGS. 1-5, the electric drill 20 comprises a motor 24 having a motor shaft 22, a switch having two brackets 25 and functioning to start/stop the motor 24, an outputting shaft 28 having an outer toothed ring 27, a gearbox housing 30, a multistage transmitting gear train 60 connecting the motor shaft 22 and the outputting shaft 28, a torque sensing ring 80 driven by the multistage transmitting gear train 60 for rotation, an axially movable gearshift ring 120 coupled to the multistage transmitting gear train 60, a gearshift fork 130, a C-shaped metal ring 160 having three supporting feet 162, a tension spring 164 arranged between the gearbox housing 30 and the gearshift fork 130, two tension springs 164 arranged between the torque sensing ring 80 and the gearbox housing 30, a positioning latch 170, and a compression spring 180 coupled to the positioning latch 170, wherein the positioning latch 170 comprises a cylindrical main body 172, which constitutes, together with a first hole 90 formed in a front surface of the torque sensing ring 80, a positioning device, and two supporting feet 174 extending downward from the main body 172 to constitute, together with the switch 26, a positioning releasing device.

The gearbox housing 30 comprises a supporting disk 36 forming a central bore 32, two connecting holes 34, and a lower portion forming radial protruding portions 35; a first gearbox housing 40 having an inner surface in which a plurality of grooves 38 is formed in a uniformly and circumferentially distributed manner, the first gearbox housing 40 also forming a first axial slot 42, three second axial slots 44, and axial guiding grooves 46, all of which extend through inner and outer surfaces thereof, the first gearbox housing 40 further forming, in a rear end portion thereof, a second hole 48 that receives the positioning latch 170 and the compression spring 180, a third hole extending through the second hole 48 and the outer surface of the housing, arc grooves 52, and arc supporting legs 54, the supporting feet 174 of the positioning latch 170 extending through the third hole 50 and projecting out of the first gearbox housing 40; and a second gearbox housing 58 having a radial projection 56. To assemble, the arc supporting legs 54 of the first gearbox housing 40 partly overlay outer circumferential surfaces of the protruding portions 35 of the supporting disk 36 and are fixed by means of screws or other means known in the art, and a front end of the first gearbox housing 40 and a rear end of the second gearbox housing 58 are also connected together by screws or other means known to the art to define a cavity that receives the multistage transmitting gear train 60.

The multistage transmitting gear train 60 comprises first, second, and third planetary gear sets 62, 64, 66; first, second, and third planetary frames 68, 70, 72; a first inner toothed ring 74 formed on an inner circumferential surface of the torque sensing ring 80; a second inner toothed ring 76 formed on an inner circumferential surface of the gearshift ring 120; and a third inner tooth ring 78.

The torque sensing ring 80 comprises an annular main body 82, and two sliding levers 110 and a metal spring plate 112 fit to the annular main body 82, wherein the sliding lever 110 comprises a right-angled triangular or right-angled trapezoidal main body 114, a connecting portion 116 that is set close to two right-angle sides of the main body 114 and extending downward, and a groove 118 formed in the connecting portion 116. Arc supporting legs 84 and arc grooves 86 are formed on a rear end of an upper portion of the annular main body 82; a protruding portion 88 is formed on a front end of a lower portion of the annular main body 82 and radially extends outward, wherein the protruding portion 88 forms, in a symmetric manner, two axially-extending holes 90 to allow the variable speed tool to effect automatic speed change in both forward rotation and reverse rotation; an annular protruding portion 92 and a sliding groove 96 having two through holes 94 are formed on an outer circumferential surface of the annular main body 82, wherein a middle portion of a front surface 98 of the sliding groove 96 protrudes inward to form a projecting portion 104 defined by a topside 100 and two lateral sides 102; the annular main body 82 forms, on the inner circumferential surface thereof, the first inner teeth ring 74 and first arc grooves 106 corresponding to the two through holes 94. The connecting portions 116 of the sliding levers 110 extend through the through holes 94 that extend through the sliding grooves 96 and the first arc grooves 106, and the metal spring plate 112 is received in the first arc grooves 106 and engages the grooves 118 of the connecting portions 116 (see FIG. 4b). The so assembled main bodies (114) are positioned with the hypotenuses thereof abutting against the lateral sides 102 of the projecting portion 104, one right-angle side thereof and the topside 100 of the projecting portion 104 constituting a continuous front surface, which, together with a rear surface 95 of the sliding groove 96, delimits an arc groove 97 (see FIG. 4a), the other right-angle side of the main body 114 and a side surface 99 of the sliding groove 96 delimiting an axial groove 91, and the hypotenuse of the main body 114 and the lateral side 102 of the projecting portion 104 together delimiting an oblique groove 93.

The gearshift ring 120 forms the second inner teeth ring 76 on the inner circumferential surface thereof and an annular groove 122 in an outer circumferential surface thereof. A plurality of protruding portions 124 is formed on a front portion of the outer circumferential surface in a uniformly and circumferentially distributed manner. The protruding portions 124 are releasably engageable with the plurality of grooves 38 distributed on the inner surface of the first gearbox housing 40.

The gearshift fork 130 comprises a semi-cylindrical main body 132 having an outer surface in which a through hole 134 and an arc groove 136 that receives the C-shaped metal ring 160 are formed and three through holes (not shown) that extend through inner and outer surfaces thereof defined in the arc groove 136. The three supporting feet 162 of the C-shaped metal ring 160 respectively extend through the three through holes and radially extend inward. The main body 132 forms on the inner surface thereof axially extending ribs 138 and a guiding portion 140 extending downward.

The first planetary frame 68 has an outer circumferential surface forming an outer toothed ring 142, a rear end surface forming supports 144 for coupling with the first planetary gear set 62, and a front end surface having a center to which a first sun gear 146 is mounted.

The second planetary frame 70 has a rear end surface forming supports 148 for coupling with the second planetary gear set 64 and a front end surface having a center to which a second sun gear 150 is mounted.

The third planetary frame 72 has a rear end surface forming supports 152 for coupling with the third planetary gear set 66 and a front end surface having a center to which an inner toothed ring (not shown) engageable with the outer toothed ring 27 of the outputting shaft 28 is mounted.

To assemble, the torque sensing ring 80 is received in the first gearbox housing 40 with the annular main body 82 and the arc supporting legs 84 thereof riding on opposite sides of the supporting disk 36 to axially fix the torque sensing ring 80 and the arc grooves 86 partly receiving the radial protruding portions 35 of the supporting disk 36 to allow rotation of the torque sensing ring 80 in a given range of rotation. An end of each tension spring 166 is attached to the annular protruding portion 92 of the torque sensing ring 80, and an opposite end is attached to the corresponding connecting hole 34 of the supporting disk 36. The tension springs 166 function to restore the original position of the torque sensing ring 80 for the rotation thereof. The motor shaft 22 of the motor 24 extends through the central bore 32 of the supporting disk 36 and drives the rotation of the first planetary gear set 62 that mates the first inner toothed ring 74 of the torque sensing ring 80 and thus rotating the first planetary frame 68. The first sun gear 146 of the first planetary frame 68 drives the rotation of the second planetary gear set 64 that mates the second inner toothed ring 76 of the gearshift ring 120 and thus rotating the second planetary frame 70. The second sun gear 150 of the second planetary frame 70 drives the rotation of the third planetary gear set 66 that mates the third inner toothed ring 78 to thereby cause the outputting shaft 28 to rotate and output a rotating speed.

The gearshift fork 130 overlays the outer circumferential surface of the first gearbox housing 40 with the guiding portion 140 thereof extending through the first axial slot 42 of the first gearbox housing 40 and is received in the arc groove 97 of the torque sensing ring 80. The ribs 138 of the gearshift fork 130 are received in the axial guiding grooves 46 of the first gearbox housing 40 so that the gearshift fork 130 is axially movable along the axial guiding grooves 46. The three supporting feet 162 of the C-shaped metal ring 160 that is fit to the gearshift fork 130 extend through the three second axial slots 44 of the first gearbox housing 40 respectively to connect the annular groove 122 formed in the outer circumferential surface of the gearshift ring 120. An end of the tension spring 164 is connected to the through hole 134 of the gearshift fork 130, and an opposite end thereof is connected to the radial projection 56 of the second gearbox housing 58.

Figure 6A:
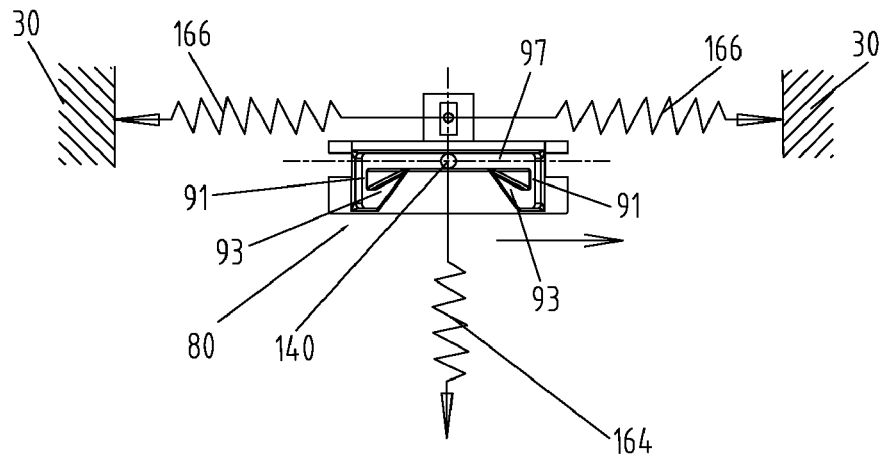
FIG. 6a is a schematic view illustrating the situation when the load torque does not reach a predetermined value, wherein a torque sensing ring overcomes a spring force of a second spring member and rotates and a guiding portion of a gearshift fork moves in an arc groove of a torque sensing ring.
Figure 6B:
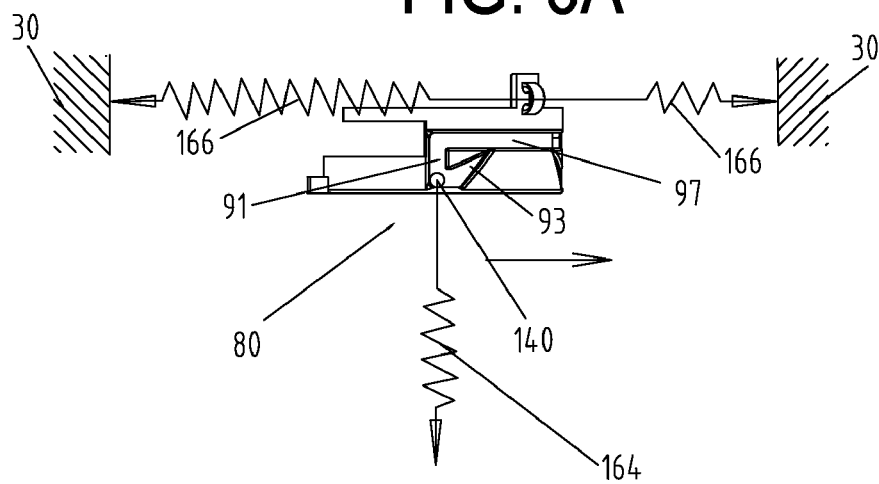
FIG. 6b is a schematic view illustrating the situation when the load torque reaches a predetermined value, wherein the torque sensing ring overcomes the spring force of the second spring member and further rotates and the guiding portion of the gearshift fork takes axial movement along an axial groove of the torque sensing ring as being acted upon by a tensioning force of a first spring member.
Figure 6C:
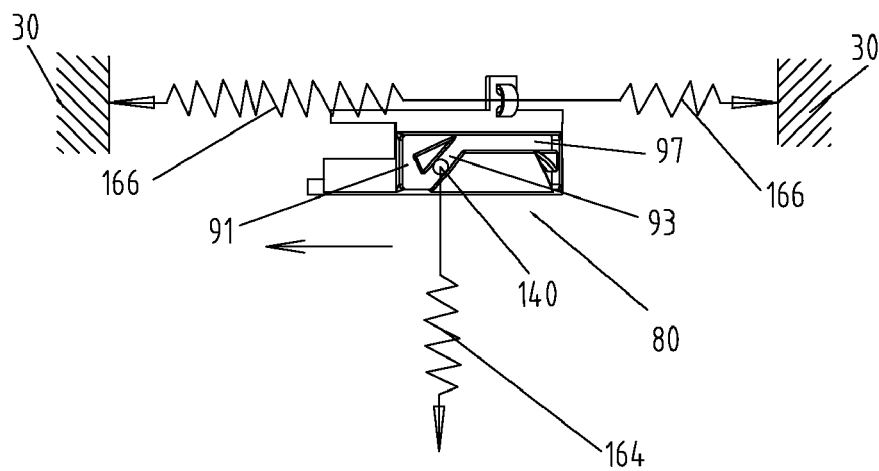
FIG. 6c is a schematic view illustrating the situation that the torque sensing ring is returned under the action of the second spring member and the guiding portion of the gearshift fork overcomes the spring force of the first spring member to axially move rearward along the oblique groove of the torque sensing ring.

Referring to FIGS. 1-6c, to operate, the switch 26 is depressed to start the motor 24 and the electric drill 20 starts to work. The depression of the switch 26 causes the brackets to move rearward and separate from the supporting feet 174 of the positioning latch 170 and the electric drill 20 is set to a first working state. At this moment, the second inner toothed ring 76 of the gearshift ring 120 simultaneously engage the outer toothed ring 142 of the first planetary frame 68 and the second planetary gear set 64, and the guiding portion 140 of the gearshift fork 130 is received in the arc groove 97 of the torque sensing ring 80. When the load torque is increased and the motor 24 maintains a fixed output power, the first planetary gear set 62 drives the torque sensing ring 80 to rotate. In case that variation of the load torque does not reach a predetermined threshold, since the guiding portion 140 of the gearshift fork 130 is constrained by the front surface of the arc groove 97 (as shown in FIG. 6*a*) so as not to take axial movement, and is only allowed to move back and forth in the arc groove 97, whereby the electric drill 20 stably operates in a first working state to provide an output of high speed and low torque. When the variation of the load torque reaches the predetermined threshold, the torque sensing ring 80 rotates to a second angular position whereby the guiding portion 140 of the gearshift fork 130 is released from the constraint of the front surface of the arc groove 97 and is moved axially and forward along the axial groove 91 by being acted upon by the tension spring 164 (as shown in FIG. 6*b*), whereby the C-shaped ring 160 of the gearshift fork 130 causes the gearshift ring 120 to axially move forward to a second axial position, where the inner toothed ring 76 of the gearshift ring 120 disengages from the outer toothed ring 142 of the first planetary frame 68 and also establishes engagement with the second planetary gear set 64. Meanwhile, the protruding portions 124 formed on the outer circumference of the gearshift ring 120 mate the grooves 38 defined in the inner wall of the gearbox housing 30. When the rotation of the torque sensing ring 80 brings the first hole 90 formed in the front surface 88 of the torque sensing ring 80 to a position in alignment with the second hole 48 formed in the rear end portion of the first gearbox housing 40, the main body 172 of the positioning latch 170 is caused to extend rearward into the first hole 90 under the action of the compression spring 180, whereby the electric drill 20 stably operates in a second working state to continuously provide an output of low rotational speed and high torque. When the switch 26 is released to stop the operation of the electric drill 20, the brackets 25 of the switch 26 push the supporting feet 174 of the positioning latch 170 to compress the compression spring 180 so that the main body 172 of the positioning latch 170 is allowed to disengage from the first hole 90, releasing the angular positioning of the torque sensing ring 80. Meanwhile, the torque sensing ring 80 is acted upon by the tension springs 166 to rotate in the reversed direction to restore to the original position, and the guiding portion 140 of the gearshift fork 130 axially moves backward along the oblique groove 93 and pushes the hypotenuse of the sliding lever 110 to cause rotation about the connecting portion 116, as shown in FIG. 6*c*, until the guiding portion 140 of the gearshift fork 130 returns to the arc groove 97 and the hypotenuse of the sliding lever 110 is caused by the action of the metal spring plate 112 to resume abutting against the lateral side 102 of the projecting portion 104. In a next time operation, the switch 26 is actuated, and the above process is repeated.

Figure 7:
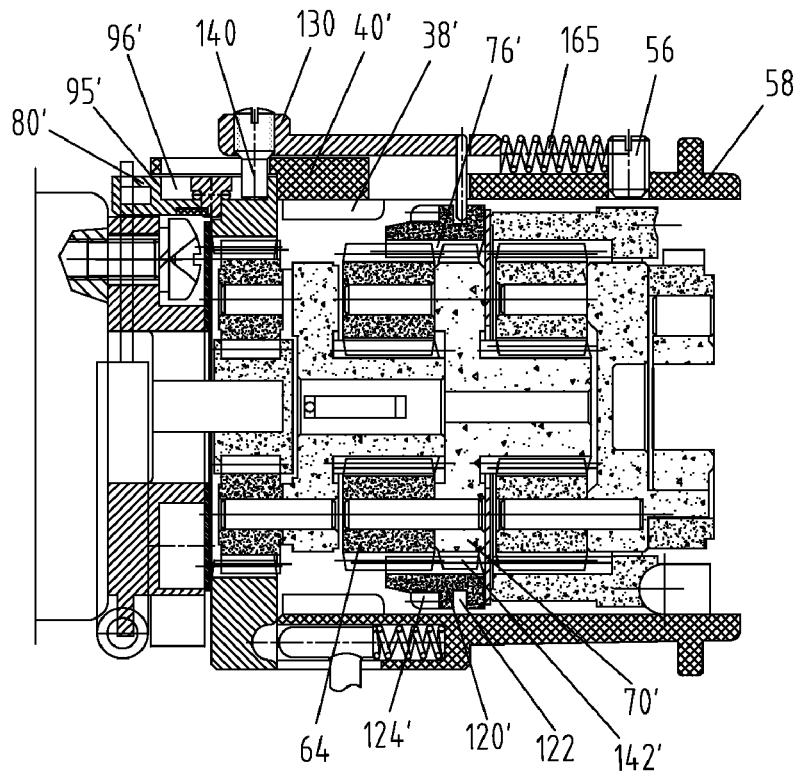
FIG. 7 is a partial schematic view of a multistage variable speed transmitting mechanism of an electric drill according to a second preferred embodiment of the present invention.
Figure 8:
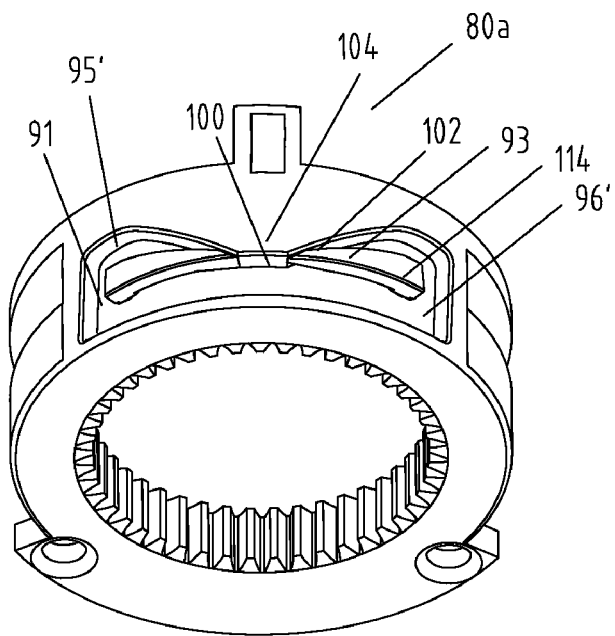
FIG. 8 is a perspective view of a torque sensing ring according to the second preferred embodiment of the present invention.

Referring to FIGS. 7 and 8, a second preferred embodiment of the present invention is different from the first preferred embodiment in that a middle portion of a rear surface 95' of a sliding groove 96' of a torque sensing ring 80*a* protrudes inward to form a projecting portion. An outer toothed ring 142' is formed on an outer circumferential surface of a second planetary frame 70'. A plurality of protruding portions 124' is uniformly and circumferentially formed on a rear portion of an outer circumferential surface of a gearshift ring 120'. The protruding portions 124 are releasably engageable with a plurality of grooves 38' formed in an inner surface of a first gearbox housing 40'. A compression spring 165 is arranged between a radial projection 56 of a second gearbox housing 58 and a gearshift fork 130. In a first working state, a second inner toothed ring 76' of the gearshift ring 120' simultaneously mates an outer toothed ring 142' of the second planetary frame 70' and a second planetary gear set 64. When the load torque reaches a predetermined threshold, the rotation of the torque sensing ring 80*a* allows the gearshift fork 130 to axially move rearward under the action of the compression spring 165, bringing the gearshift ring 120' to axially move rearward. In a second working state, the second inner toothed ring 76' of the gearshift ring 120' disengages from the outer toothed ring 142' of the second planetary frame 70' and establishes engagement with the second planetary gear set 64. Meanwhile, the protruding portions 124' formed on the outer circumference of the gearshift ring 120' mate the grooves 38' defined in the gearbox housing inner wall.

Figure 9:
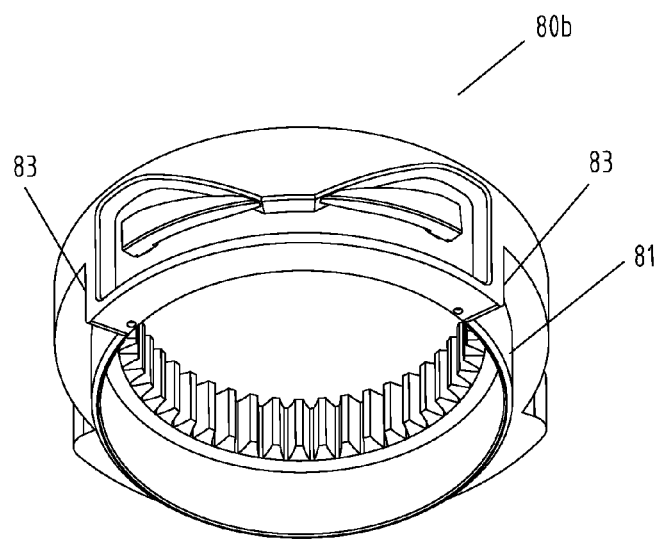
FIG. 9 is a perspective view of a torque sensing ring according to a third preferred embodiment of the present invention.
Figure 10:
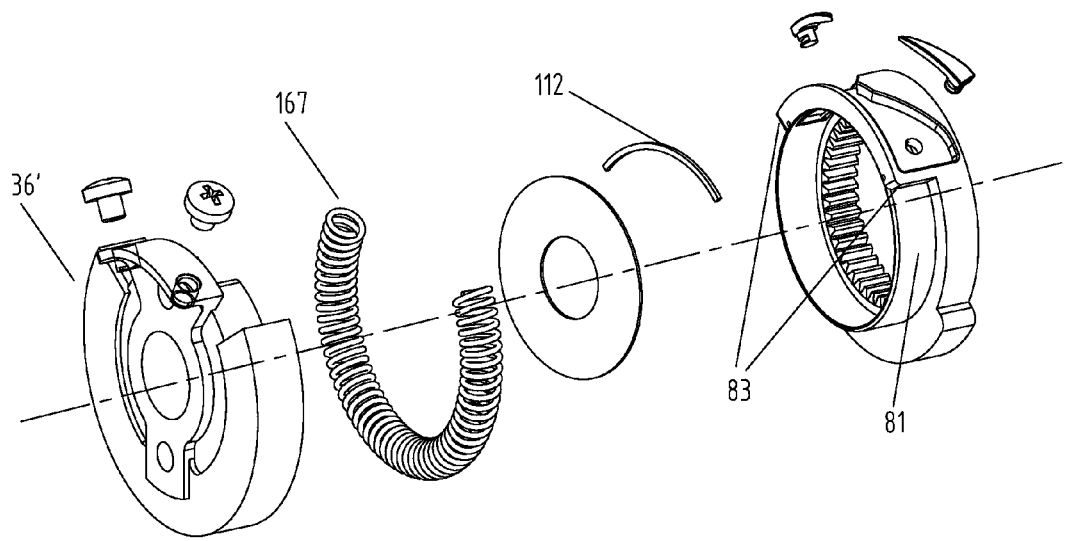
FIG. 10 is a partial exploded view of a multistage variable speed transmitting mechanism of an electric drill according to the third preferred embodiment of the present invention.

Referring to FIGS. 9 and 10, a third preferred embodiment of the present invention differs from the first or second preferred embodiment in that a compression spring 167 replaces the tension spring 166 to realize the position restoration of a torque sensing ring 80*b*. A second arc groove 81 is formed in an outer circumferential surface of the torque sensing ring 80*b*. The second arc groove 81 has opposite end surfaces 83. A supporting disk 36' has an inner circumferential surface forming an arc groove (not shown) that opposes the second arc groove 81 to thereby together define a receiving space that receives the compression spring 167. Opposite ends of the compression spring 167 are respectively set against the opposite end surfaces 83 of the second arc groove 81 to allow the torque sensing ring 80*b* to effect automatic position restoration.

Figure 11:
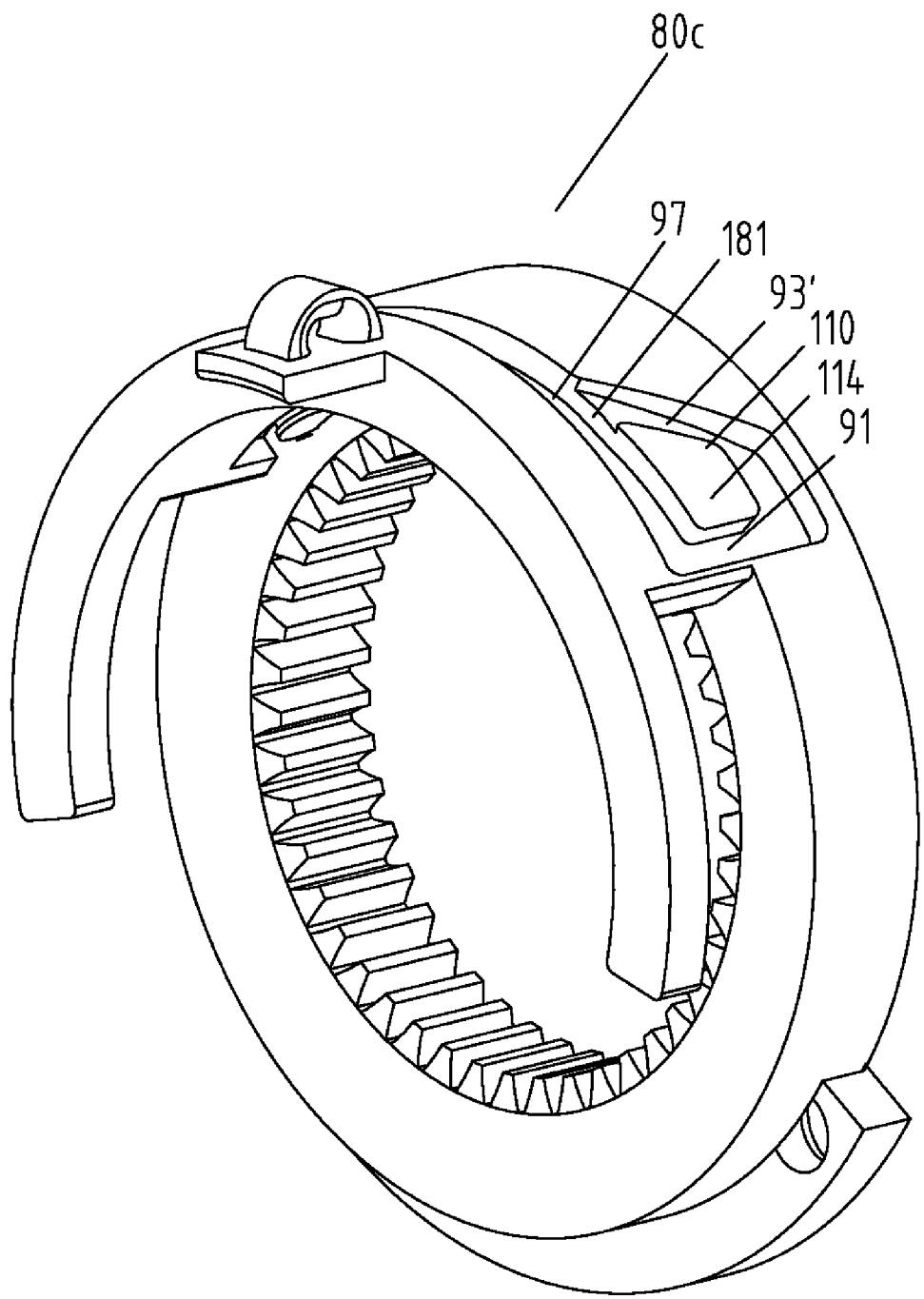
FIG. 11 is a perspective view of a torque sensing ring according to a fourth preferred embodiment of the present invention.

Referring to FIG. 11, a fourth preferred embodiment of the present invention is different from the first, second, or third preferred embodiment in that the sliding lever 110 of a torque sensing ring 80*c* is fixedly arranged in a first arc groove, and a hypotenuse of a main body 114 and a lateral side 102 of a projecting portion 104 commonly define an oblique groove 93'. The oblique groove 93' has a bottom that ascends from an end connecting an axial groove 91 to an opposite end connecting an arc groove 97, whereby an end surface 181 thereof is higher than a bottom of the arc groove 97. A straight side of the main body 114, the end surface 181 of the oblique groove 93, and a topside 100 of the projecting portion 104 together form a continuous end surface of the arc groove 97. Another straight side of the main body 114 and a side surface 99 of the first arc groove define the axial groove 91.

According to the structure disclosed above, a variable speed control method of the present invention is applied to a variable speed tool, which comprises a power source, which is typically an electric motor, a gearshift housing, an outputting shaft, a multistage transmitting gear train coupled to the power source and the outputting shaft, a torque sensing device coupled to the multistage transmitting gear train and having an axis of rotation, and a gearshift device coupled to the torque sensing device, the gearshift device being movable between a first axial position and a second axial position, the outputting shaft having first and second output rotating speeds that are different when the gearshift device is located at the first axial position or at the second axial position respectively. The control method comprises the following steps:

(1) sensing an outputting torque of the outputting shaft by the torque sensing device;

(2) converting a variation of the outputting torque so sensed into a rotation angle of the torque sensing device;

(3) maintaining the gearshift device at the first axial position to have the outputting shaft providing the first output rotating speed when the rotation angle of the torque sensing device is between a first angle and a second angle; and (4) moving the gearshift device to the second axial position to have the outputting shaft providing the second output rotating speed when the rotation angle of the torque sensing device reaches the second angle.

The variable speed control method of the present invention further comprises a positioning step for positioning the torque sensing device at the second angle, when the rotation angle of the torque sensing device reaches the second angle, so as to set the gearshift device at the second axial position and allow the outputting shaft to continuously provide the second output rotating speed; and a positioning releasing step for releasing the torque sensing device from being positioned at the second angle, when the torque of the outputting shaft becomes zero, so as to return the gearshift device back to the first axial position and allow the outputting shaft to provide the first output rotating speed.

Also, the groove 38 of the gearbox housing 30 may be replaced by an annular wedge-shaped surface and the protruding portion 124 of the gearshift ring 120 may be replaced by another wedge-shaped surface for preventing the rotation of the gearshift ring 120 by means of friction when mating each other. The guiding portion 140 of the gearshift fork 130 may be integrally formed with the main body 132, or may alternatively be formed by inserting a pin into a through hole of the main body, or may be further alternatively formed by fitting a pin into a blind hole defined in the gearshift fork 130, and further receiving a spring in the blind hole to realize axial moveability of the pin. Also, any person having ordinary skills in the art can easily figure out interchange of the sliding groove formed in the torque sensing ring and the guiding portion formed on the gearshift fork so as to make the sliding groove in the gearshift fork and the guiding portion on the torque sensing ring. In short, the present invention is not limited to the specific structures of above embodiments and various structures that are provided on the basis of the principles of the invention are considered belonging to the scope of protection of the present invention.

What is claimed is:

1. A variable speed tool comprising:
   a switch;
   a gearbox housing;
   a motor;
   an outputting shaft;
   a multistage transmitting gear train and a gearshift ring coupled to the motor and the outputting shaft; and
   a torque sensing ring, which is driven to rotate by the multistage transmitting gear train; and
   wherein the variable speed tool further comprises a gearshift fork coupled to the gearshift ring and a first spring member which drives the gearshift fork in an axial direction of the gearshift ring, a second spring member being arranged between the torque sensing ring and the housing, one of the torque sensing ring and the gearshift fork forming a sliding groove and the other one forming a guiding portion movably received in the sliding groove, whereby when a load of the outputting shaft reaches a predetermined value, the torque sensing ring overcomes a spring force of the second spring member and rotates so that the gearshift fork is driven by the first spring member to take axial movement thereby moving the gearshift ring between a first position and a second position.

2. The variable speed tool as claimed in claim 1, wherein the sliding groove comprises at least an arc groove, an axial groove, and an oblique groove connecting the arc groove and the axial groove, and wherein the arc groove, the axial groove, and the oblique groove form a continuous path.

3. The variable speed tool as claimed in claim 1 or 2, wherein the sliding groove is defined in an outer circumferential surface of the torque sensing ring, the sliding groove having two axial surfaces and two side surfaces, one of the axial surfaces having a middle portion that protrudes inward to form a projecting portion that comprises a topside and two lateral sides, a pair of sliding levers being respectively disposed at opposite ends of the sliding groove, the sliding lever comprising a main body of a right-angled triangular shape or a right-angled trapezoidal shape, the arc groove being delimited between a straight side of the main body, together with the topside of the projecting portion, and the other one of the axial surfaces, the axial groove being delimited between another straight side of the main body and the side surface of the sliding groove, the oblique groove being delimited between a hypotenuse of the main body and the respective lateral side of the projecting portion.

4. The variable speed tool as claimed in claim 3, wherein the sliding lever has an end that is free and an opposite end rotatably connected to the sliding groove, the sliding lever comprising a connecting portion radially extending downward from the main body, a third spring member being arranged between the connecting portion and the sliding groove, the sliding lever being acted upon by the third spring element to have the hypotenuse of the main body abutting against the respective lateral side of the projecting portion, one of the straight sides of the main body and the topside of the projecting portion together forming a continuous surface of the arc groove.

5. The variable speed tool as claimed in claim 4, wherein the third spring member is a torque spring having an end connected to the sliding lever and an opposite end connected to the sliding groove.

6. The variable speed tool as claimed in claim 4, wherein a first inner toothed ring has an inner circumferential surface forming a first arc groove and two through holes that extend through the sliding groove and the first arc groove, the connecting portion forming a groove, the connecting portion of the sliding lever extending through the respective through hole, the third spring member being a metal spring received in the first arc groove and engaging the groove of the sliding lever.

7. The variable speed tool as claimed in claim 3, wherein the oblique groove has a bottom that gradually ascends from an end connecting the axial groove to an opposite end connecting the arc groove to make an end surface of the oblique groove higher than a bottom of the arc groove, one of the straight sides of the main body, the end surface of the oblique groove, and the topside of the projecting portion together forming a continuous end surface of the arc groove.

8. The variable speed tool as claimed in claim 1 or 2, wherein the first spring member comprises a tension spring having an end connected to the gearbox housing and an opposite end connected to the gearshift fork.

9. The variable speed tool as claimed in claim 1 or 2, wherein the first spring member comprises a compression spring.

10. The variable speed tool as claimed in claim 1 or 2, wherein the second spring member comprises a pair of tension springs arranged on an outer circumference of the torque sensing ring, the tension springs having an end connected to the torque sensing ring and an opposite end connected to the gearbox housing.

11. The variable speed tool as claimed in claim 1 or 2, wherein the torque sensing ring forms a second arc groove in an outer circumferential surface thereof for receiving the second spring member, the second spring member comprising a compression spring having opposite ends respectively set against opposite end surfaces of the second arc groove.

12. The variable speed tool as claimed in claim 1 or 2, wherein the multistage transmitting gear train comprises at least a first planetary frame, a first planetary gear set, a first inner toothed ring formed on an inner circumferential surface of the torque sensing ring, a second planetary frame, and a second planetary gear set, the gearbox housing comprising a first connecting member, the gearshift ring comprising inner teeth formed on an inner circumferential surface thereof and a second connecting member formed an outer circumferential surface, the first connecting member being detachably engageable with the second connecting member.

13. The variable speed tool as claimed in claim 12, wherein in the first position, the inner teeth of the gearshift ring engage the first planetary frame and the second planetary gear set, and in the second position, the inner teeth of the gearshift ring disengages from the first planetary frame and engages the second planetary gear set and the second connecting member of the gearshift ring and the first connecting member of the gearbox housing mate each other.

14. The variable speed tool as claimed in claim 12, wherein the first connecting member comprises a plurality of grooves and the second connecting member comprises a plurality protruding portions corresponding to the grooves.

15. The variable speed tool as claimed in claim 1 or 2, wherein the torque sensing ring forms two axially-extending first holes in a front surface thereof the torque sensing ring, the gearbox housing forming a second axial hole and a third hole in communication with the second hole, the second hole receiving a compression spring and a positioning latch therein, the positioning latch comprising a main body axially extending rearward along the second hole and two supporting feet extending through the third hole and projecting out of the first gearbox housing, the supporting feet being detachably coupled to the switch.

16. The variable speed tool as claimed in claim 1 or 2, wherein the gearshift fork and the gearshift ring are coupled to each other by a C-shaped metal ring, the metal ring being fixedly coupled to the gearshift fork, the gearshift ring having an outer circumference forming an annular groove that receives the metal ring and is rotatable with respect to the metal ring.

17. A variable speed tool comprising:
a housing;
a power source;
a power source switch;
an outputting shaft; and
a multistage transmitting gear train coupled to the power source and the outputting shaft; and
the variable speed tool further comprising:
a torque sensing device coupled to the multistage transmitting gear train, the torque sensing device having an axis of rotation and rotatable between a first angle and a second angle in response to a load torque of the outputting shaft, and
a gearshift device coupled to the torque sensing device, the gearshift device being movable between a first axial position and a second axial position, the multistage transmitting gear train have different output torque when the gearshift device is in the first axial position and the second axial position;
wherein one of the torque sensing device and the gearshift device forms a sliding groove and the other forms a guiding portion movably received in the sliding groove; when variation of the load torque of the outputting shaft is within a range not exceeding a predetermined value, the torque sensing device is allowed to rotate within a range from the initial first angle and not exceeding the second angle so as to maintain the gearshift device in the first axial position where the multistage transmitting gear train provides a first outputting torque; and when the load torque of the outputting shaft increases to the predetermined value, the torque sensing device rotates to the second angle and causes the gearshift device to move to the second axial position, whereby the multistage transmitting gear train changes from the first outputting torque to a second outputting torque and maintains the second outputting torque until the load torque varies from a first predetermined value to a second predetermined value.

18. The variable speed tool as claimed in claim 17, wherein the torque sensing device comprises a torque sensing ring that is rotatable about a center of rotation, the torque sensing ring having an outer circumference forming an arc receiving groove disposed on the outer circumferential surface of the torque sensing ring for receiving a second spring member therein.

19. The variable speed tool as claimed in claim 18, wherein the second spring member received in the arc receiving groove of the torque sensing ring comprises a pair of tension springs, the tension springs having an end pivoted to an end surface of the arc receiving groove and an opposite end pivoted to the housing.

20. The variable speed tool as claimed in claim 18, wherein the second spring member received in the arc receiving groove of the torque sensing ring comprises a compression spring, the compression spring having opposite ends respectively abutting against opposite ends of the arc receiving groove.

21. The variable speed tool as claimed in claim 19 or 20, wherein the sliding groove is formed in the torque sensing ring and the guiding portion is formed on the gearshift device.

22. The variable speed tool as claimed in claim 21, wherein the sliding groove is formed in an outer circumferential surface of the torque sensing ring, the sliding groove having two axial surfaces and two side surfaces, one of the axial surfaces having a middle portion that protrudes inward to form a projecting portion that comprises a topside and two lateral sides, a pair of sliding levers being respectively disposed at opposite ends of the sliding groove and each comprising a main body of a right-angled triangular shape or a right-angled trapezoidal shape, the arc groove being delimited between a straight side of the main body, together with the topside of the projecting portion, and the other one of the axial surfaces, the axial groove being delimited between another straight side of the main body and the side surface of the sliding groove, the oblique groove being delimited between a hypotenuse of the main body and the respective lateral side of the projecting portion.

23. The variable speed tool as claimed in claim 22, wherein the guiding portion of the gearshift device is located in the arc groove to maintain the gearshift device in the first axial position and make the variable speed tool output a first torque when the torque sensing ring rotates between the initial first angle and not exceeding the second angle.

24. The variable speed tool as claimed in claim 23, wherein the gearshift device comprises a gearshift fork and a gearshift ring, the guiding portion being formed on the gearshift fork, the movement of guiding portion within the sliding groove causing the gearshift fork to drive the gearshift ring to move between the first axial position and the second axial position.

25. The variable speed tool as claimed in claim 24, wherein the gearshift device further comprises a first spring member, the first spring member being a tension spring having an end connected to the gearshift ring and an end connected to the housing.

26. The variable speed tool as claimed in claim 25, wherein the guiding portion of the gearshift fork moves to the second axial position along the axial groove as being acted upon by the first spring member to make the variable speed tool output a second torque when the torque sensing ring rotates to the second angle.

27. The variable speed tool as claimed in claim 26, wherein speed variable tool further comprises a positioning device, which, when the torque sensing ring rotates to the second angle, positions the torque sensing ring, making the torque sensing ring stopped from rotating to allow the variable speed tool to continuously output the second torque.

28. The variable speed tool as claimed in claim 27, wherein the positioning device comprises a first hole formed in the torque sensing ring and a positioning latch with a compression spring disposed in a second hole of the housing.

29. The variable speed tool as claimed in claim 28, wherein the first hole of the torque sensing ring is aligned with the second hole of the housing to allow the positioning latch received in the second hole to insert into the first hole of the torque sensing ring when the torque sensing ring rotates to the second angle.

30. The variable speed tool as claimed in claim 29, wherein the variable speed tool further comprises a positioning releasing device used to release the positioning of the torque sensing ring.

31. The variable speed tool as claimed in claim 30, wherein the positioning releasing device is a push switch, which drives the positioning latch to disengage from the first hole of the torque sensing ring so as to allow the torque sensing ring to return to the first angle under the action of the second spring member when an operator presses the pressing switch.

32. The variable speed tool as claimed in claim 31, wherein when the torque sensing ring return restores to the first angle, the guiding portion of the gearshift device moves along the oblique groove to return the gearshift device to the first axial position.

33. The variable speed tool comprising:
a power source;
a housing;
a switch;
an outputting shaft; and
a multistage transmitting gear train coupled to the power source and the outputting shaft; and
the variable speed tool comprising:
a torque sensing device coupled to the multistage transmitting gear train, the torque sensing device having a center of rotation and being rotatable between first and second angular positions according to a load torque of the outputting shaft, and
a gearshift device coupled to the torque sensing device, the gearshift device being movable between a first axial position and a second axial position, whereby when the gearshift device is at the first axial position and the second axial position, the multistage transmitting gear train shows different output characteristics;
wherein a positioning device is provided for coupling to the torque sensing device, and when the torque sensing device rotates to the predetermined second angular position, the positioning device prevents the torque sensing device from rotating in response to variation of torque of the outputting shaft.

34. The variable speed tool as claimed in claim 33, wherein the variable speed tool further comprises a positioning releasing device for releasing the positioning device of the torque sensing ring to return the torque sensing device to the original first angular position.

35. The variable speed tool as claimed in claim 34, wherein the torque sensing device has a front end surface and the positioning device comprises a first hole defined in the front end surface of the torque sensing device, a second hole defined in a corresponding axial position of the housing and a third hole in communication with the second hole, and a compression spring and a positioning latch received in the second hole and the third hole, the positioning latch comprising a main body axially extending in a direction toward the first hole defined in the front end surface of the torque sensing device along the second hole, the positioning releasing device comprising a supporting foot, which is integrally connected to the positioning latch and extends outward through the third hole, and the switch, the supporting foot being detachably pivoted to the switch.

36. The variable speed tool as claimed in claim 35, wherein the compression spring of the positioning device exerts an axial force on the positioning latch to make a front end of the positioning latch continuously abutting against the front end surface of the torque sensing device.

37. The variable speed tool as claimed in claim 36, wherein the torque sensing device comprises a torque sensing ring forming a groove in an outer surface thereof for receiving a second spring member, the second spring member comprising a pair of tension springs, and wherein when torque of the outputting shaft is zero, the two tension springs reaches a balance of force applied thereto and the torque sensing ring is located at the original first angular position, and when the torque of the outputting shaft is larger than zero and smaller than a predetermined value, the torque sensing ring rotates between an initial first angle and not exceeding a predetermined second angle.

38. The variable speed tool as claimed in claim 37, wherein the first hole defined in the front end surface of the torque sensing ring is set at the predetermined second angular position and wherein when an output torque of the outputting shaft reaches the predetermined value, the torque sensing ring rotates to the second angular position to make the main body of the positioning latch insert into the first hole to prevent the torque sensing ring from changing rotation angle in response to variation of torque of the outputting shaft.

39. The variable speed tool as claimed in claim 38, wherein the switch comprises a push switch for opening or closing the power source, and wherein the push switch, when pressed, disengages from the supporting foot of the positioning releasing device to allow the positioning latch to insert into the first hole of the torque sensing ring and the push switch, when released, engages and drives the supporting foot of the positioning releasing device to make the positioning latch disengaging from the first hole of the torque sensing ring and allowing the torque sensing ring to return to the original first angular position under the action of the tension springs.

40. The variable speed tool as claimed in claim 39, wherein the gearshift device comprises a gearshift fork and a gearshift ring coupled to each other and wherein one of the torque sensing ring and the gearshift fork forms a sliding groove and the other forms a guiding portion slidable in the sliding groove.

41. The variable speed tool as claimed in claim 40, wherein the sliding groove is defined in an outer circumferential surface of the torque sensing ring, the sliding groove having two axial surfaces and two side surfaces, one of the axial surfaces having a middle portion that protrudes inward to form a projecting portion that comprises a topside and two lateral sides, a pair of sliding levers being respectively disposed at opposite ends of the sliding groove and each comprising a main body of a right-angled triangular shape or a right-angled trapezoidal shape, the arc groove being delimited between a straight side of the main body, together with the topside of the projecting portion, and the other one of the axial surfaces, the axial groove being delimited between another straight side of the main body and the side surface of the sliding groove, the oblique groove being delimited between a hypotenuse of the main body and the respective lateral side of the projecting portion.

42. The variable speed tool as claimed in claim 41, wherein the guiding portion of the gearshift device moves back and forth in the arc groove and the gearshift device maintains at the first axial position when the torque sensing ring rotates between the first angle and the second angle.

43. The variable speed tool as claimed in claim 42, wherein a first spring member is arranged between the gearshift ring and the housing, the first spring member comprising a tension spring that drives the gearshift ring to move toward the second axial position.

44. The variable speed tool as claimed in claim 43, wherein the guiding portion of the gearshift device disengages from the arc groove and slides in the axial groove when the torque sensing ring rotates to the second angle, so as to make the gearshift ring moving from the first axial position to the second axial position under the action of the first spring member, and wherein the main body of the positioning latch engages the first hole of the torque sensing ring to position the torque sensing ring when the torque sensing ring rotates to the second angle.

45. The variable speed tool as claimed in claim 44, wherein when the push switch is released, the positioning latch is driven to disengage from the first hole of the torque sensing ring to make the torque sensing ring return from the second angle to the original first angle under the action of the second spring member and the guiding portion of the gearshift device slides in the oblique groove to make the gearshift ring moving from the first axial position to the second axial position.

46. The variable speed tool as claimed in claim 45, wherein a third spring member is mounted to the sliding lever to maintain a normally closed position of the oblique groove when the guiding portion does not slide therein.

47. A variable speed control method for a variable speed tool applied for controlling the variable speed tool to change speed between a first outputting rotating speed and a second outputting rotating speed, wherein the variable speed tool comprises a power source, a housing, an outputting shaft, a multistage transmitting gear train coupled to the power source and the outputting shaft, a torque sensing device coupled to the multistage transmitting gear train and having an axis of rotation, and a gearshift device coupled to the torque sensing device, the gearshift device being movable between a first axial position and a second axial position, the outputting shaft providing a first output rotating speed and a second output rotating speed that are different when the gearshift device is located at the first axial position and the second axial position respectively, the variable speed control method comprising the following steps: (1) sensing an outputting torque of the outputting shaft by the torque sensing device; (2) converting a variation of the outputting torque so sensed into a rotation angle of the torque sensing device; (3) maintaining the gearshift device at the first axial position to have outputting shaft providing the first output rotating speed when the rotation angle of the torque sensing device is between a first angle and a second angle; and (4) moving the gearshift device to the second axial position to have the outputting shaft providing the second output rotating speed when the rotation angle of the torque sensing device reaches the second angle.

48. The variable speed control method as claimed in claim 47 further comprising a positioning step for positioning the torque sensing device at the second angle, when the rotation angle of the torque sensing device reaches the second angle, so as to set the gearshift device at the second axial position and allow the outputting shaft to continuously provide the second output rotating speed.

49. The variable speed control method as claimed in claim 48 further comprising a positioning releasing step for releasing the torque sensing device from being positioned at the second angle, when the torque of the outputting shaft becomes zero, so as to return the gearshift device back to the first axial position and allow the outputting shaft to provide the first output rotating speed.

50. The variable speed control method as claimed in claim 49, wherein the first output rotating speed is larger than the second output rotating speed.

* * * * *